US012717947B1

(12) United States Patent
Fuentes et al.

(10) Patent No.: US 12,717,947 B1
(45) Date of Patent: Aug. 25, 2026

(54) DETECTION OF ANOMALOUS ACCESS TO REPOSITORIES OF VERSION CONTROL PLATFORMS

(71) Applicant: Trend Micro Incorporated, Tokyo (JP)

(72) Inventors: Rodwin Jaca Fuentes, Taipei (TW); Joseph Cepe, Las Colinas, TX (US); Brian Cayanan, Manila (PH); Jessica Patricia Sta Ana Balaquit, Mandaluyong (PH)

(73) Assignee: Trend Micro Incorporated, Tokyo (JP)

( * ) Notice: Subject to any disclaimer, the term of this patent is extended or adjusted under 35 U.S.C. 154(b) by 311 days.

(21) Appl. No.: 18/588,364

(22) Filed: Feb. 27, 2024

(51) Int. Cl.

| | |
|---|---|
| ***G06F 21/62*** | (2013.01) |
| ***G06F 16/901*** | (2019.01) |
| ***G06F 21/60*** | (2013.01) |

(52) U.S. Cl.
CPC ...... *G06F 21/6218* (2013.01); *G06F 16/9024* (2019.01); *G06F 21/604* (2013.01); *G06F 2221/2101* (2013.01); *G06F 2221/2141* (2013.01)

(58) Field of Classification Search
CPC ............. G06F 21/6218; G06F 16/9024; G06F 21/604; G06F 2221/2101; G06F 2221/2141
See application file for complete search history.

(56) References Cited

U.S. PATENT DOCUMENTS

2021/0021595 A1* 1/2021 File ........................ G06N 20/00
2022/0394049 A1* 12/2022 Abrahamian ......... G06F 40/134

OTHER PUBLICATIONS

Danielle Gonzalez, Thomas Zimmermann, Patrice Godefroid, Max Schafer, "Anomalicious: Automated Detection of Anomalous and Potentially Malicious Commits on GitHub", https://patricegodefroid.github.io/public_psfiles/icse2021.pdf, Downloaded Dec. 29, 2023.
"Access Control", Wikipedia, https://simple.wikipediaorg/wiki/Access_control, Downloaded Dec. 29, 2023.
"Access Permissions on GitHub", GitHub Docs, https://docs.githubcom/en/get-started/learning-about-github/access-permissions-on-github, Downloaded Dec. 29, 2023.
Thamindu Dilshan Jayawickrama, "Community Detection Algorithms", Medium, https://towardsdatascience.com/community-detection-algorithms-9bd8951e7dae, Jan. 29, 2021.
Shyam Sundar Meena, "Community Detection Using Louvain", Medium, https://medium.com/@ssmeena7/community-detection-using-louvain-61b460fd80b3#:~text=4, May 18, 2023.
(Continued)

*Primary Examiner* — Baotran N To
(74) *Attorney, Agent, or Firm* — Beyer Law Group LLP

(57) ABSTRACT

A version control platform has repositories for storing files of software development projects. A repository network graph is created, with nodes of the repository network graph representing repositories and edges between nodes representing access to repositories by the same user during a sampling time period. Communities in the repository network graph are detected using a community detection algorithm. Repositories represented by nodes in outlier communities are monitored for anomalous access.

20 Claims, 6 Drawing Sheets

(56) References Cited

OTHER PUBLICATIONS

"Community Structure", Wikipedia, https://en.wikipedia.org/wiki/Community_structure, Downloaded Nov. 16, 2023.
"Louvain Method", Wikipedia, https://en.wikipedia.org/wiki/Louvain_method, Downloaded Nov. 16, 2023.
"Modularity (Networks)", Wikipedia, https://en.wikipedia.org/wiki/Modularity_(networks), Downloaded Dec. 14, 2023.
"Reviewing the Audit Log for Your Organization", GitHub Docs, https://docs.github.com/en/enterprise-cloud@latest/organizations/keeping-your-organization-secure/managing-security-settings-for-your-organization/reviewing-the-audit-log-for-your-organization, Downloaded Nov. 16, 2023.
V. A. Traag, L. Waltman, N.J. van Eck, "From Louvain to Leiden: Guaranteeing Well-Connected Communities", Scientific Reports, https://www.nature.com/articles/s41598-019-41695-z, Published Mar. 26, 2019.

* cited by examiner

DETECTION OF ANOMALOUS ACCESS TO REPOSITORIES OF VERSION CONTROL PLATFORMS

TECHNICAL FIELD

The present disclosure is directed to cybersecurity.

BACKGROUND

Version control platforms allow software engineers to collaborate on software development projects. Examples of version control platforms include the GitHub platform, and platforms that run the Apache Subversion version control system and the Mercurial source control management tool. A software development project has a corresponding repository on the version control platform, with the repository comprising storage space that contains the files and other data of the software development project.

A software development organization, such as a software vendor, may own or have access to several repositories. The organization may limit access to its repositories to designated users of the organization. However, it is quite possible for malicious actors to perform unauthorized access to repositories. For example, the version control platform may be hacked or compromised. As another example, the login credential of a user may be stolen. Yet another example, a user may perform unauthorized access to certain repositories. Given the large number of repositories and users of today's software development organizations, it is very difficult to detect anomalous access to repositories.

BRIEF SUMMARY

In one embodiment, a method of detecting an anomalous access to a repository of a version control platform includes detecting access to a plurality of repositories of the version control platform during a sampling time period, each of the plurality of repositories storing one or more files of a software development project. A repository network graph is created. The repository network graph comprises a plurality of nodes and a plurality of edges, each of the plurality of nodes representing a repository of the plurality of repositories, each edge of the plurality of edges connecting two nodes of the plurality of nodes and having a weight that is based on a number of times repositories represented by the two nodes connected by the edge were accessed by the same user during the sampling time period. A plurality of communities in the repository network graph is detected based on the weights of the edges. An outlier community of the plurality of communities is identified. Access to repositories that are represented by nodes in the outlier community is monitored. After the sampling time period, it is detected that a first user, for a first time, accessed a first repository that is represented by a node in the outlier community. An alert is raised based at least on detecting that the first user accessed the first repository.

In another embodiment, a system for detecting anomalous access to repositories of a version control platform includes the version control platform and a backend system. The version control platform comprises a plurality of repositories, each of the plurality of repositories providing a storage space for storing one or more files of a software development project. The backend system comprises at least one processor and a memory, the memory of the backend system stores instructions that when executed by the at least one processor of the backend system cause the backend system to: receive an audit log from the version control platform; detect, from records of the audit log, access to a plurality of repositories of the version control platform during a sampling time period; create a repository network graph that comprises a plurality of nodes and a plurality of edges, each of the plurality of nodes representing a repository of the plurality of repositories, each edge of the plurality of edges connecting two nodes of the plurality of nodes and having a weight that is based on a number of times repositories represented by the two nodes connected by the edge were accessed by the same user during the sampling time period; detect a plurality of communities in the repository network graph based on the weights of the edges; identify a set of outlier communities of the plurality of communities; monitor access to repositories that are represented by nodes in the set of outlier communities; detect, after the sampling time period, that a first user, for a first time, accessed a first repository that is represented by a node in an outlier community of the set of outlier communities; and raise an alert based at least on detecting that the first user accessed the first repository.

In yet another embodiment, a method of detecting an anomalous access to a repository of a version control platform includes detecting, from records of an audit log, access to a plurality of repositories of the version control platform during a sampling time period. A repository network graph is created. The repository network graph comprises a plurality of nodes and a plurality of edges, each of the plurality of nodes representing a repository of the plurality of repositories, each edge of the plurality of edges connecting two nodes of the plurality of nodes and having a weight that is based on a number of times repositories represented by the two nodes connected by the edge were accessed by the same user during the sampling time period. A plurality of communities in the repository network graph is detected in accordance with the Louvain community detection algorithm. A set of outlier communities of the plurality of communities is identified. Access to repositories that are represented by nodes in the set of outlier communities is monitored while ignoring access to repositories that are not represented by nodes in the set of outlier communities. After the sampling time period, an access by a first user, for a first time, to a first repository that is represented by a node in an outlier community of the set of outlier communities is detected. The access by the first user to the first repository is detected as an anomalous access in response to the access by the first user to the first repository satisfying a condition of a policy.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
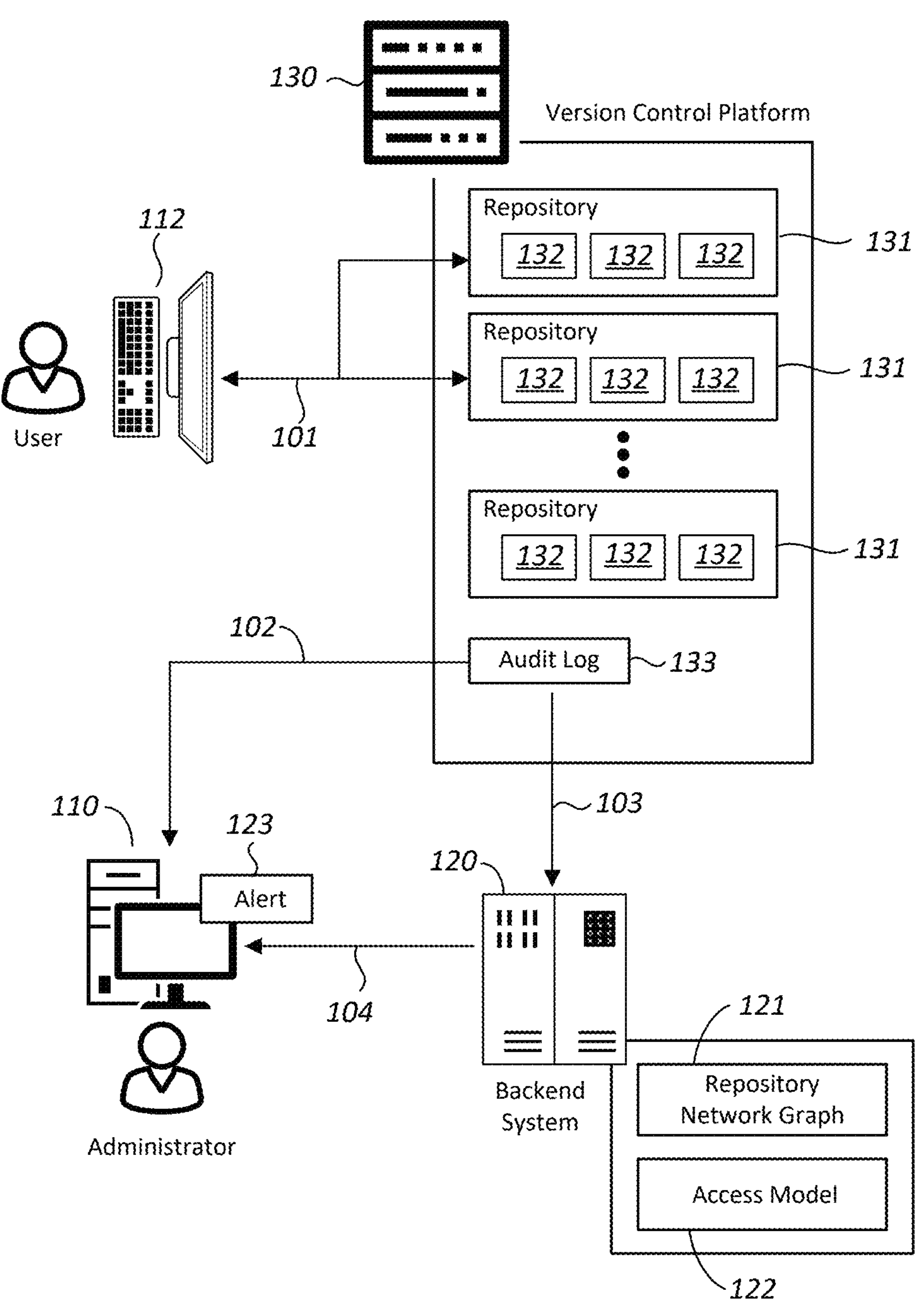
FIG. 1 shows a block diagram of a system for detecting anomalous access to repositories of a version control platform, in accordance with an embodiment of the present invention.

FIG. 1 shows a block diagram of a system for detecting anomalous access to repositories of a version control platform, in accordance with an embodiment of the present invention. In the example of FIG. 1, the system includes a version control platform 130 and a backend system 120. The version control platform 130 includes a plurality of repositories 131, with each repository 131 providing storage space for files 132 and other data of a software development project. The repositories 131 may be implemented on network attached storage, cloud storage, or other storage system of or accessible to the version control platform 130. The version control platform 130 may be accessed over the public Internet. In one embodiment, the version control platform 130 is the GitHub platform.

A user employs a computer 112 to access one or more repositories 131 (see arrow 101). The version control platform 130 can accommodate a plurality of users, but only one is shown for clarity of illustration. Examples of user access to a repository 131 include making a commit to make a discrete change to a file 132; making a pull request to merge one or more commits into a different branch; retrieving a file 132; and performing other user actions permitted by the particular version control platform 130. Access to repositories 131 are recorded by the version control platform 130 in an audit log 133. An administrator of a repository 131 may employ a computer 110 to review the audit log 133 to identify users that accessed particular repositories 131 (see arrow 102).

A software development organization may have many users, and own or have access to a large number of repositories 131. This makes it very difficult for the administrator of the organization to monitor the repositories 131 for anomalous access. As its name suggests, an anomalous access to a repository is not normal is thus highly suspicious and indicative of an unauthorized access to the repository. Anomalous access to a repository needs to be investigated, but some organizations have limited resources to do so especially when there are a large number of anomalous access. False positives, i.e., identifying a normal access as anomalous, exacerbates the problem.

The backend system 120 is a computer system that is configured to detect anomalous access to repositories 131. In one embodiment, the backend system 120 is external to the version control platform 130. The backend system 120 may be implemented on a cloud computing platform (e.g., the Amazon Web Services (AWS)™ platform) or on a dedicated server computer system, for example. The backend system 120 may provide the anomalous access detection as a third-party software as a service (SaaS) to software development organizations. As can be appreciated, the functionality of the backend system 120 as described herein may also be incorporated into the version control platform 130.

In one embodiment, the backend system 120 detects anomalous access from recorded entries in the audit log 133. The backend system 120 retrieves records of the audit log 133 (see arrow 103), e.g., over the public Internet using an application programming interface (API) of the version control platform 130. The backend system 120 processes the records to identify access to repositories 131 during a predetermined sampling time period; create a repository network graph 121 comprising nodes and edges, with each node representing a repository 131, and each edge having a weight that indicates a number of times repositories represented by the two nodes connected by the edge were accessed by the same user during the sampling time period; detect communities of nodes ("communities") in the network graph based on the weights of the edges; and identify outlier communities among the detected communities. The repositories represented by nodes in outlier communities may be indicated in an access model 122.

The backend system 120 monitors access to repositories represented by nodes in the outlier communities, while ignoring (i.e., filtering out) access to repositories that are not represented by nodes in the outlier communities. Focusing monitoring on repositories represented by nodes in outlier communities advantageously reduces detection noise and false positives.

A repository that is represented by a node that belongs to an outlier community is also referred to herein as an outlier repository. In one embodiment, access to an outlier repository is qualified by a policy that has one or more conditions. An access to an outlier repository is deemed to be an anomalous access when the access to the repository satisfies the one or more conditions of the policy. For example, the policy may limit access to a particular repository to users that normally access the particular repository, e.g., based on a number of accesses to the repository per window of time as recorded in the audit log 133. In that example, access to an outlier repository by a user that does not normally access that outlier repository (e.g., accessed that outlier repository for the first time) is deemed to be an anomalous access.

The backend system 120 raises an alert responsive to detecting an anomalous access to a repository 131. The alert may include making an entry in a security log or in the audit log 133, sending a text or email message to the administrator, displaying a notification message on a display screen, etc. In the example of FIG. 1, the backend system 120 sends an alert 123 to the computer 110 in response to detecting an anomalous access to a repository 131. The alert 123 may be sent by email (e.g., as an attachment or link to a webpage), displayed by a local user interface, etc. The alert 123, which is a notification message displayed on a display screen of the computer 110, notifies the administrator of the anomalous access to the repository 131. The alert 123 allows the administrator to initiate investigation of the anomalous access.

The repository network graph 121 comprises a plurality of nodes, with each node representing a particular repository 131. Two nodes in the repository network graph 121 are connected by an edge, with the edge having a weight that is based on a number of times repositories 131 represented by the two nodes were accessed by the same user within a predetermined sampling time period. The sampling time period depends on the particulars of the cybersecurity application.

In one embodiment, the sampling time period is 90 days. In that embodiment, repositories 131 that were accessed by the same user during the 90-day sampling time period are represented as connected nodes in the repository network graph 121. The weight of an edge connecting two nodes in the repository network graph 121 is indicative of a number of times repositories 131 represented by the two nodes were accessed by the same user during the 90-day sampling time period. As can be appreciated, a first user can access repositories 131 represented by two nodes one or more times during the 90-day sampling time period, a second user can access repositories 131 represented by the two nodes one or more times during the 90-day sampling time period, etc. The weight of the edge connecting the two nodes reflect the access by the first user, the second user, etc. to repositories 131 represented by the two nodes during the 90-day sampling time period.

Figure 2:
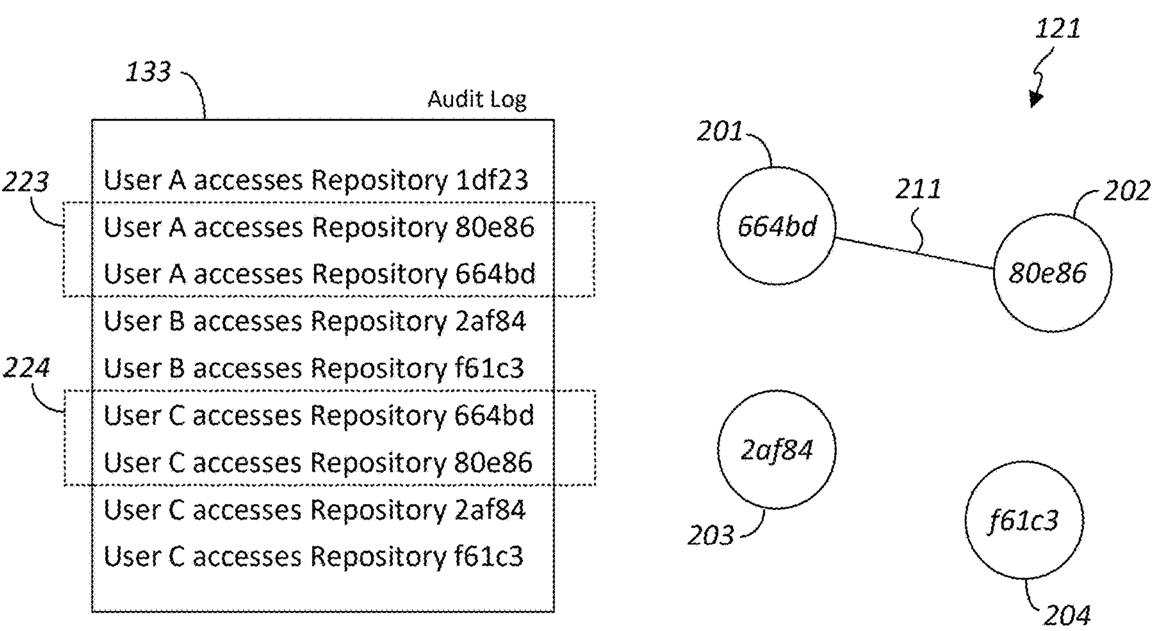
FIGS. 2-4 pictorially illustrate a method of creating a repository network graph, in accordance with an embodiment of the present invention.
Figure 3:
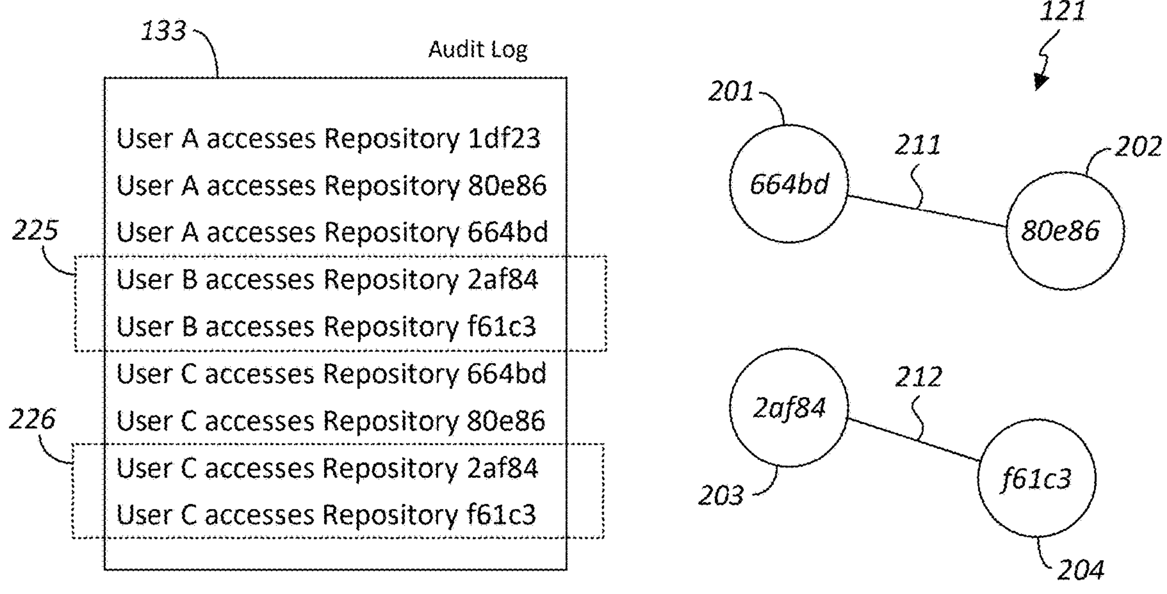
Figure 4:
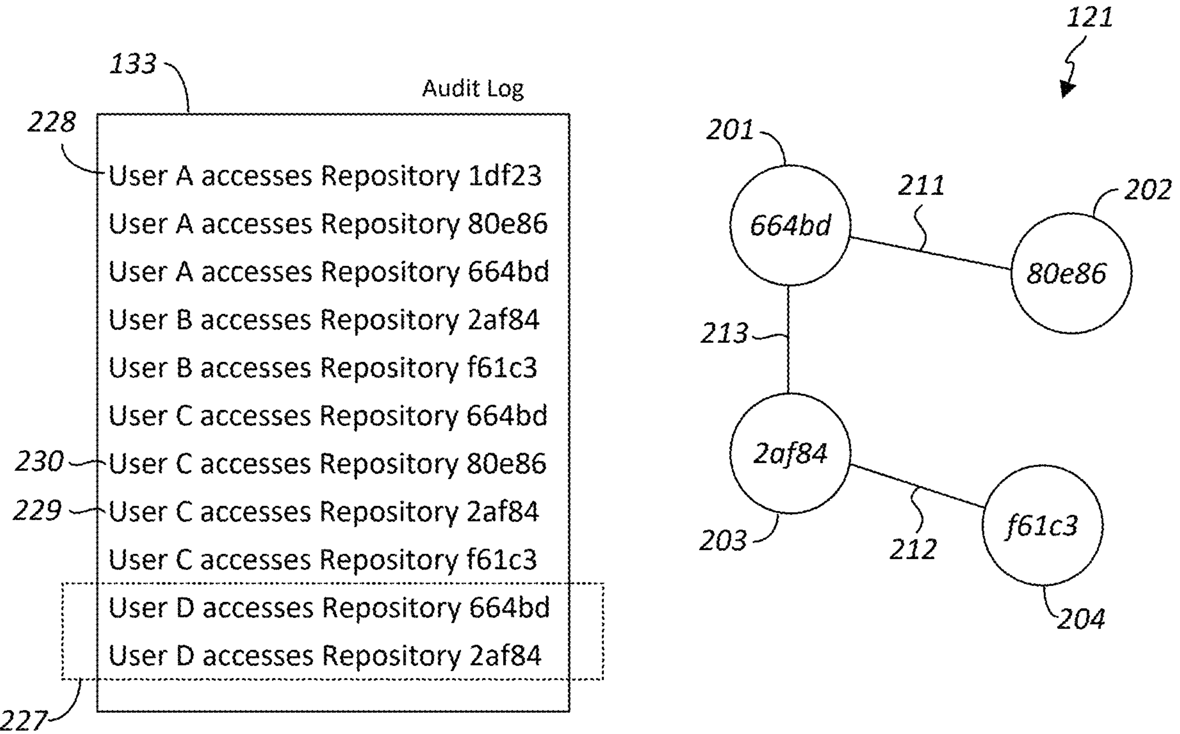

FIGS. 2-4 pictorially illustrate a method of creating a repository network graph 121, in accordance with an embodiment of the present invention. In FIGS. 2-4, the audit log 133 contains records of accesses to particular repositories 131 during a sampling time period (e.g., 90 days). Timestamps of the accesses are not shown for clarity of illustration. Each repository 131 is identified by its corresponding repository identifier in the audit log 133.

Referring first to FIG. 2, the audit log 133 indicates that user A accessed repositories having identifiers **80*e*86 and 664*bd* (see FIG. 2, 223), which are represented by nodes 202 and 201, respectively, in the repository network graph 121, during the sampling time period. An edge 211 connects the nodes 201 and 202 and reflects access to the repositories 80*e*86 and 664*bd* by the same user A. The audit log 133 further indicates that user C also accessed the repositories 80*e*86 and 664*bd* (see FIG. 2, 224) during the sampling time period. The weight of the edge 211 reflects access of the user A to the repositories represented by the nodes 201 and 202 during the sampling time period, and the access of the user C to the repositories represented by the nodes 201 and 202 during the sampling time period. The more users that each accessed both the nodes 201 and 202 during the sampling time period and the more times a particular user accessed both the nodes 201 and 202 during the sampling time period, the greater the weight of the edge 211**.

Referring to FIG. 3, the audit log 133 further indicates that user B accessed repositories **2*af*84 and f61*c*3 (see FIG. 3, 225), which are represented by nodes 203 and 204, respectively, during the sampling time period. The audit log 133 further indicates that user C also accessed the repositories 2*af*84 and f61*c*3 during the sampling time period. The edge 212 connecting the nodes 203 and 204 reflects the access to the nodes 203 and 204 by the user B and by the user C. As before, the weight of the edge 212 is indicative of the number of times the repositories represented by the nodes 203 and 204** were accessed by the same user, which in this example is by the user B and separately by the user C.

Referring to FIG. 4, the audit log 133 further indicates that user D accessed repositories **664*bd* and 2*af*84 (see FIG. 4, 227) during the sampling time period. The edge 213 connects the nodes 201 and 203 in the repository network graph 121 to reflect the access by the user D to the repositories 664*bd* and 2*af*84** during the sampling time period.

As can be appreciated, the repository network graph 121 will have many nodes and edges, most of which are not specifically shown in FIGS. 2-4 for clarity of illustration. More particularly, the user A accessed repository **1*df*23 (see FIG. 4, 228) in addition to repositories 80*e*86 and 664*bd* during the sampling time period. The repository network graph 121 thus includes a node (not shown) that represents the repository 1*df*23, an edge (not shown) that connects that node to the node 201, and another edge (not shown) that connects that node to the node 202. Similarly, yet another edge (not shown) connects the node 203 to the node 202 because the same user (i.e., user C) accessed the repositories 2*af*84 (see FIGS. 4, 229) and 80*e*86 (see FIG. 4, 230**) during the sampling time period.

In the context of network graphs, a community refers to a subgroup or cluster of nodes that are densely connected to each other within the larger network. The idea is that nodes within a community have more connections to each other than they do to nodes outside the community. Communities in the repository network graph 121 may be detected using a conventional community detection algorithm. In one embodiment, the Louvain community detection algorithm is applied on the repository network graph 121 to detect communities in the repository network graph 121, with each identified community having an assigned community identifier (ID).

Generally, the Louvain community detection algorithm detects clusters of repositories that have high interaction rates, effectively grouping related repositories in a same community. These clusters are assumed to be analogous to real-life structures, such as in inter-team project collaboration, multi-team operations, or other indicators of normative work processes, and may be used as a baseline for normal access patterns. Access that is not normal is deemed to be anomalous.

Figure 5:
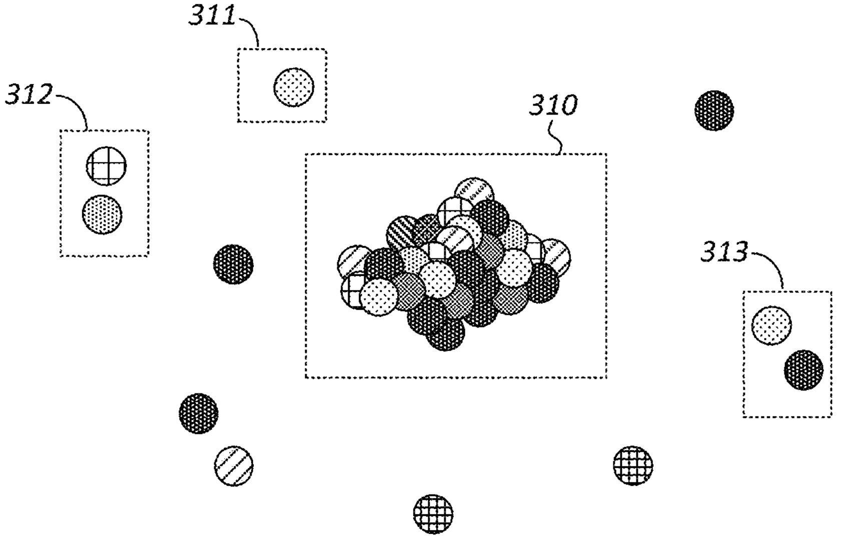
FIG. 5 pictorially illustrates nodes of a repository network graph as clustered into communities, in accordance with an embodiment of the present invention.

FIG. 5 pictorially illustrates nodes of the repository network graph 121 as clustered into communities, in accordance with an embodiment of the present invention. In the example of FIG. 5, each circle represents a node. A community 310 has nodes that are frequently accessed together. Nodes belonging to the community 310 have strong connections, which are reflected by their edge weights in the repository network graph 121. The Louvain community detection algorithm identifies these nodes with strong connections and groups them into corresponding communities. The inventors believe that repositories that are frequently accessed together by the same user typically represent repositories that contain libraries or common codes. Access to these repositories are most likely normal. Monitoring these repositories for anomalous access may result in an unacceptable number of event detections and false positives.

In marked contrast to nodes in the community 310, nodes that belong to outlier communities are loosely connected, which are reflected by lower edge weights. In the example of FIG. 5, communities 311, 312, and 313 are outlier communities.

Repositories represented by nodes in outlier communities, i.e., outlier repositories, may be monitored more closely because access to them is likely anomalous. For example, users that normally access outlier repositories may be identified based on frequency of access as noted in the audit log 133. In one embodiment, access to a particular outlier repository by a user who does not normally access that particular outlier repository is deemed to be anomalous. For example, a user who accessed an outlier repository for the first time may be deemed to have performed an anomalous access to the outlier repository.

Figure 6:
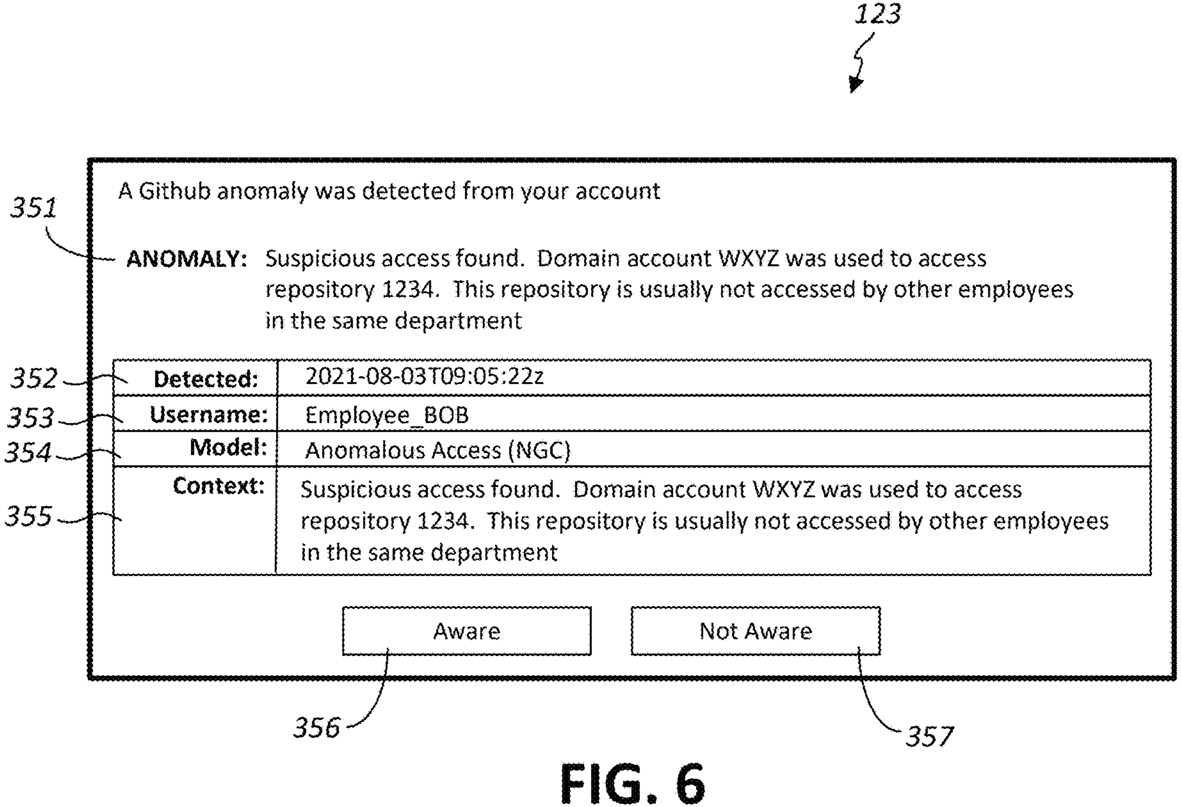
FIG. 6 shows an alert in accordance with an embodiment of the present invention.

FIG. 6 shows an alert 123, in accordance with an embodiment of the present invention. In the example of FIG. 6, the alert 123 is a notification message displayed on a display screen of a computer of the administrator or authorized user of a repository in response to detecting an anomalous access to the repository. In the example of FIG. 6, the anomalous access is an access to a repository on the GitHub platform. The alert 123 explains the anomaly (see FIG. 6, 351), which in the example of FIG. 6 is access by a user to repository 1234. The repository 1234 is not usually accessed by that user. The alert 123 includes a timestamp of the access (see FIG. 6, 352), the username of the user (see FIG. 6, 353), and the reason why the access is anomalous (see FIG. 6, 355). The alert 123 further indicates the particular access model 122 that was used to detect the anomalous access (see FIG. 6, 354). As can be appreciated, the access model 122 may be continually updated, e.g., by moving the sampling time period from time to time. Identifying the particular access model 122 is thus useful for troubleshooting, fine-tuning, and other purposes. The alert 123 includes selection buttons to allow the administrator or the authorized user of the repository to indicate whether he or she is aware (see FIG. 6, 356) or not aware of the access (see FIG. 6, 357).

Figure 7:
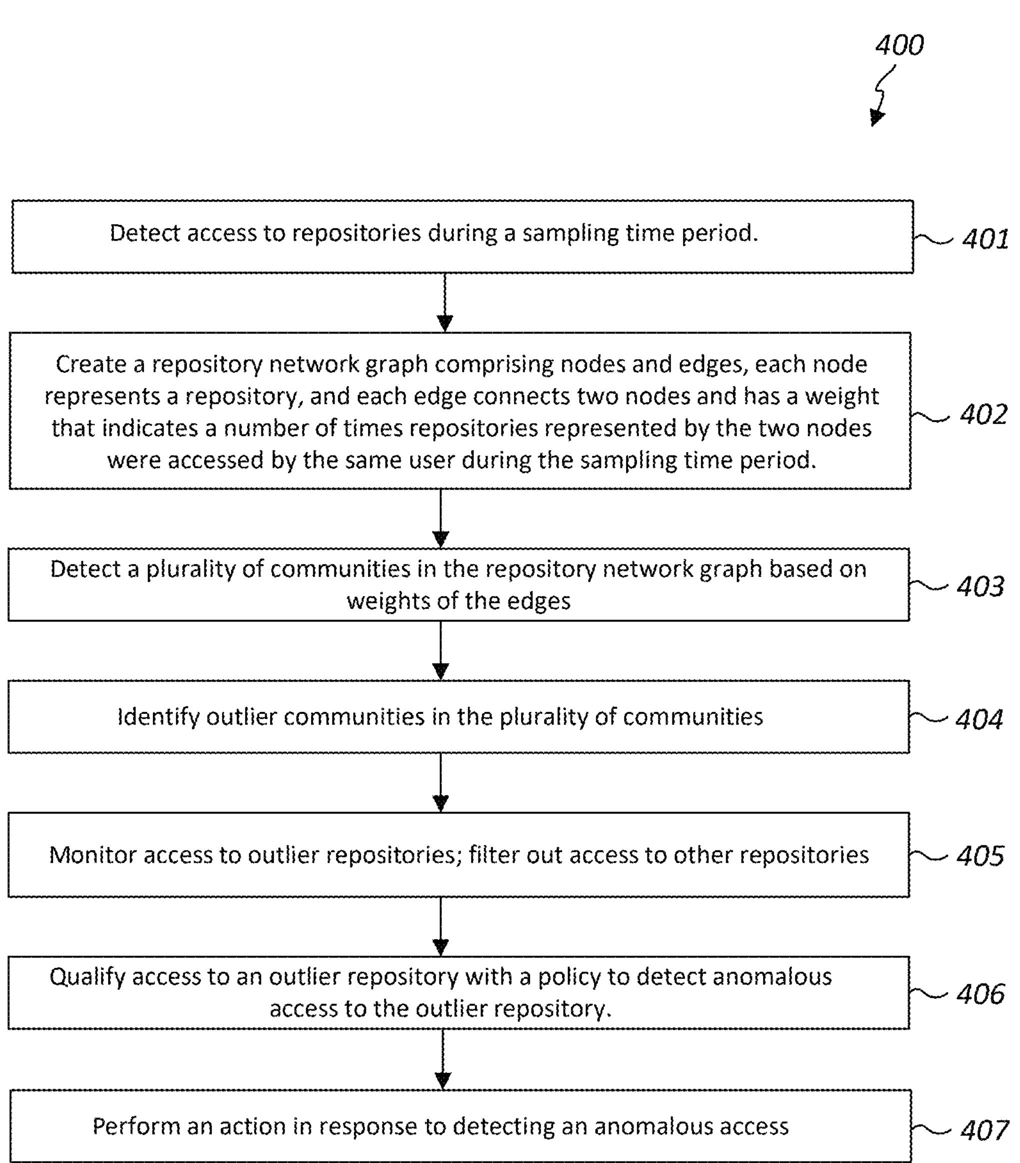
FIG. 7 shows a flow diagram of a method of detecting anomalous access to a repository of a version control platform, in accordance with an embodiment of the present invention.

FIG. 7 shows a flow diagram of a method 400 of detecting anomalous access to a repository of a version control platform, in accordance with an embodiment of the present invention. The method 400 is explained using previously-discussed components for clarity of illustration. As can be appreciated, other components may also be employed without detracting from the merits of the present invention.

In step 401, access to repositories of the version control platform during a sampling time period are detected. In one embodiment, the access to the repositories are detected from recorded entries in an audit log.

In step 402, a repository network graph is created. The repository network graph comprises a plurality of nodes and a plurality of edges. Each node represents a repository, and each edge connects two nodes and has a weight that indicates a number of times repositories represented by the two nodes were accessed by the same user during the sampling time period.

In step 403, a plurality of communities in the repository network graph is detected based on weights of the edges. The communities may be detected using a conventional community detection algorithm, which in one embodiment is the Louvain community detection algorithm.

In step 404, outlier communities in the repository network graph are detected. Each community in the plurality of communities is assigned a community ID. The community IDs of outlier communities may be indicated in an access model or other data structure for ease of reference. Access to repositories represented by nodes in outlier communities may be monitored, whereas access to other repositories may be ignored. In other words, access to repositories other than those identified to be represented by nodes in outlier communities are ignored for anomalous access detection purposes.

The outlier communities among the plurality of communities may be identified based on the modularity of the communities. Generally, modularity is a measure that quantifies the quality of a division of a network into communities. In the context of the repository network graph, modularity is based on edge weight, which indicates the strength of the connection between two nodes connected by the edge. The outlier communities will have a lower modularity score relative to other communities. Communities having a modularity score that is lower than a threshold may be identified as outlier communities. In other words, nodes in the outlier communities are more loosely connected relative to nodes of other communities.

In step 405, access to outlier repositories are monitored while filtering out (i.e., ignoring) access to other repositories for anomalous access detection purposes. In other words, to reduce false positives and enhance true-positive detection rates, anomalous access detection is performed only on repositories that are represented by nodes in outlier communities.

In step 406, an access to an outlier repository is qualified by a policy to detect an anomalous access to the outlier repository. For example, the policy may restrict access to an outlier repository only to users that normally access the outlier repository.

In step 407, a response action is performed in response to detecting an anomalous access. The response action may include raising an alert to notify an administrator of the outlier repository.

Figure 8:
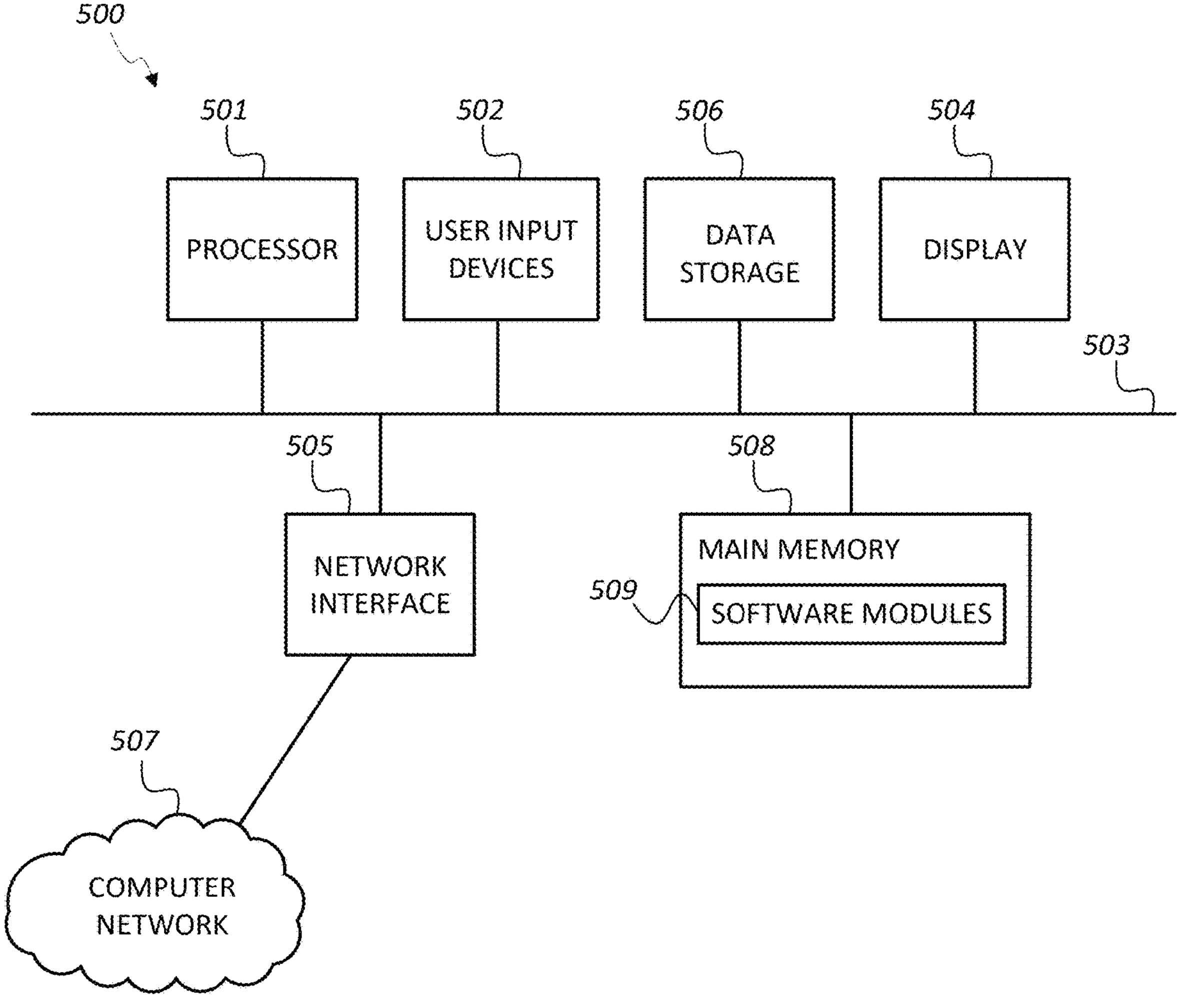
FIG. 8 shows a block diagram of a computer system that may be employed with embodiments of the present invention.

FIG. 8 shows a block diagram of a computer system 500 that may be employed with embodiments of the present invention. The computer system 500 may be employed as a backend system or other computer described herein. The computer system 500 may have fewer or more components to meet the needs of a particular cybersecurity application. The computer system 500 may include at least one processor 501. The computer system 500 may have one or more buses 503 coupling its various components. The computer system 500 may include one or more user input devices 502 (e.g., keyboard, mouse), one or more data storage devices 506 (e.g., hard drive, solid state drive), a display screen 504 (e.g., liquid crystal display, flat panel monitor), a computer network interface 505 (e.g., network adapter, modem), and a main memory 508 (e.g., random access memory). The computer network interface 505 may be coupled to a computer network 507, which in this example includes the public Internet.

The computer system 500 is a particular machine as programmed with one or more software modules 509, comprising instructions stored non-transitory in the main memory 508 for execution by at least one processor 501 to cause the computer system 500 to perform corresponding programmed steps. An article of manufacture may be embodied as computer-readable storage medium including instructions that when executed by at least one processor 501 cause the computer system 500 to be operable to perform the functions of the one or more software modules 509.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting an anomalous access to a repository of a version control platform, the method comprising:

detecting access to a plurality of repositories of a version control platform during a sampling time period, each of the plurality of repositories storing one or more files of a software development project;

creating a repository network graph that comprises a plurality of nodes and a plurality of edges, each of the plurality of nodes representing a repository of the plurality of repositories, each edge of the plurality of edges connecting two nodes of the plurality of nodes and having a weight that is based on a number of times repositories represented by the two nodes connected by the edge were accessed by a same user during the sampling time period;

detecting a plurality of communities in the repository network graph based on weights of the plurality of edges;

identifying an outlier community of the plurality of communities;

monitoring access to repositories that are represented by nodes in the outlier community;

detecting, after the sampling time period, that a first user, for a first time, accessed a first repository that is represented by a node in the outlier community; and raising an alert based at least on detecting that the first user accessed the first repository.

2. The method of claim 1, wherein detecting the access to the plurality of repositories of the version control platform during the sampling time period comprises:

receiving a log of the version control platform; and identifying the access to the plurality of repositories from records of the log.

3. The method of claim 1, wherein the plurality of communities in the repository network graph is detected in accordance with a Louvain community detection algorithm.

4. The method of claim 1, wherein the version control platform is a GitHub platform.

5. The method of claim 1, wherein raising the alert based at least on detecting that the first user accessed the first repository comprises:

qualifying, using a policy, the detection that the first user accessed the first repository; and detecting an anomalous access to the first repository by the first user in response to a condition of the policy being satisfied by the access of the first user to the first repository.

6. The method of claim 5, wherein the condition indicates that access to a repository represented by a node in the outlier community by a user that normally does not access the repository represented by the node in the outlier community is an anomalous access.

7. The method of claim 1, wherein raising the alert includes displaying a notification message on a display screen of a computer employed by an administrator or an authorized user of the first repository.

8. The method of claim 7, wherein the notification message asks the administrator or the authorized user of the first repository whether the administrator or the authorized user is aware of the access by the first user to the first repository.

9. A system for detecting anomalous access to repositories of a version control platform, the system comprising:

a version control platform comprising a plurality of repositories, each of the plurality of repositories providing a storage space for storing one or more files of a software development project; and a backend system comprising at least one processor and a memory, the memory of the backend system storing instructions that when executed by the at least one processor of the backend system cause the backend system to:

receive an audit log from the version control platform;

detect, from records of the audit log, access to the plurality of repositories of the version control platform during a sampling time period;

create a repository network graph that comprises a plurality of nodes and a plurality of edges, each of the plurality of nodes representing a repository of the plurality of repositories, each edge of the plurality of edges connecting two nodes of the plurality of nodes and having a weight that is based on a number of times repositories represented by the two nodes connected by the edge were accessed by a same user during the sampling time period;

detect a plurality of communities in the repository network graph based on weights of the plurality of edges;

identify a set of outlier communities of the plurality of communities;

monitor access to repositories that are represented by nodes in the set of outlier communities;

detect, after the sampling time period, that a first user, for a first time, accessed a first repository that is represented by a node in an outlier community of the set of outlier communities; and raise an alert based at least on detecting that the first user accessed the first repository.

10. The system of claim 9, further comprising:

a computer that is in communication with the backend system, wherein the alert is a notification message that is displayed on a display screen of the computer.

11. The system of claim 9, wherein the instructions stored in the memory of the backend system, when executed by the at least one processor of the backend system, cause the backend system to detect the plurality of communities in the repository network graph in accordance with a Louvain community detection algorithm.

12. The system of claim 9, wherein the version control platform is a GitHub platform.

13. The system of claim 9, wherein the backend system receives the audit log from the version control platform over a public Internet.

14. A method of detecting anomalous access to repositories of a version control platform, the method comprising:

detecting, from records of an audit log, access to a plurality of repositories of a version control platform during a sampling time period;

creating a repository network graph that comprises a plurality of nodes and a plurality of edges, each of the plurality of nodes representing a repository of the plurality of repositories, each edge of the plurality of edges connecting two nodes of the plurality of nodes and having a weight that is based on a number of times repositories represented by the two nodes connected by the edge were accessed by a same user during the sampling time period;

detecting a plurality of communities in the repository network graph in accordance with a Louvain community detection algorithm;

identifying a set of outlier communities of the plurality of communities;

monitoring access to repositories that are represented by nodes in the set of outlier communities while ignoring access to repositories that are not represented by nodes in the set of outlier communities;

detecting, after the sampling time period, an access by a first user, for a first time, to a first repository that is represented by a node in an outlier community of the set of outlier communities;

detecting that the access by the first user to the first repository is an anomalous access in response to the access by the first user to the first repository satisfying a condition of a policy.

15. The method of claim 14, wherein the condition of the policy indicates that access to a particular repository that is represented by a node in the set of outlier communities by a user that does not normally access the particular repository is the anomalous access.

16. The method of claim 14, further comprising:

raising an alert in response to detecting that the access by the first user to the first repository is the anomalous access.

17. The method of claim 16, wherein raising the alert comprises:

displaying a notification message on a display screen of a computer regarding the anomalous access.

18. The method of claim 17, wherein the notification message asks an administrator or authorized user of the first repository whether the administrator or the authorized user is aware of the access to the first repository by the first user.

19. The method of claim 14, wherein the version control platform is a GitHub platform.

20. The method of claim 14, further comprising:

receiving the audit log over a public Internet.

* * * * *